United States Patent
Wakefield et al.

(10) Patent No.: US 10,417,809 B2
(45) Date of Patent: Sep. 17, 2019

(54) EFFICIENT ALGORITHMS FOR VOLUME VISUALIZATION ON IRREGULAR GRIDS

(71) Applicant: Schlumberger Technology Corporation, Sugar Land, TX (US)

(72) Inventors: Mark Wakefield, Abingdon (GB); Dominic Walsh, Oxford (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 15/736,292

(22) PCT Filed: Jun. 15, 2016

(86) PCT No.: PCT/US2016/037477
§ 371 (c)(1),
(2) Date: Dec. 13, 2017

(87) PCT Pub. No.: WO2016/205265
PCT Pub. Date: Dec. 22, 2016

(65) Prior Publication Data
US 2018/0190008 A1    Jul. 5, 2018

Related U.S. Application Data

(60) Provisional application No. 62/182,415, filed on Jun. 19, 2015, provisional application No. 62/184,782, filed on Jun. 25, 2015.

(51) Int. Cl.
*G06T 15/08* (2011.01)
*G06T 15/20* (2011.01)
(Continued)

(52) U.S. Cl.
CPC ........... *G06T 15/08* (2013.01); *G01V 1/50* (2013.01); *G06T 15/06* (2013.01); *G06T 15/20* (2013.01);
(Continued)

(58) Field of Classification Search
None
See application file for complete search history.

(56) References Cited

U.S. PATENT DOCUMENTS 5,555,352 A    9/1996  Lucas
6,556,200 B1   4/2003  Pfister et al.
(Continued)

FOREIGN PATENT DOCUMENTS

EP    1081655 B1    2/2007

OTHER PUBLICATIONS

Volkert, "Real-time Ray Tracing of Dynamic Scenes", Jun. 2008.*
(Continued)

*Primary Examiner* — Jeffrey J Chow
(74) *Attorney, Agent, or Firm* — Jamie A. Castano (57) ABSTRACT

A method for raycasting based on an irregular grid. The method includes raycasting, in a static mode, rays based on the irregular grid to generate a static image of a three dimensional (3D) volume dataset. The 3D volume dataset includes irregular grid cells based on the irregular grid. The method further includes reducing a tally of the rays to generate a reduced tally of rays based on a rendering time of the static image and an animation frame rate, and generating, in a dynamic mode, an animation of the 3D volume dataset at the animation frame rate by at least performing raycasting based on the reduced tally of rays.

15 Claims, 7 Drawing Sheets

(51) Int. Cl.
*G01V 1/50* (2006.01)
*G06T 15/06* (2011.01)
*G06T 15/30* (2011.01)
*G06T 15/40* (2011.01)
*G01V 1/34* (2006.01)

(52) U.S. Cl.
CPC ............ *G06T 15/205* (2013.01); *G06T 15/30* (2013.01); *G06T 15/405* (2013.01); *G01V 1/345* (2013.01)

(56) References Cited

U.S. PATENT DOCUMENTS

| | | |
|---|---|---|
| 6,559,843 B1 | 5/2003 | Hsu |
| 7,961,187 B2 | 6/2011 | Borland et al. |
| 8,384,711 B2 | 2/2013 | Wald et al. |
| 8,736,600 B2 | 5/2014 | Lin et al. |
| 9,690,885 B2 | 6/2017 | Walsh et al. |
| 2009/0167763 A1* | 7/2009 | Waechter ................ G06T 15/06 345/426 |
| 2010/0134491 A1* | 6/2010 | Borland ................... G06T 15/06 345/424 |
| 2010/0188396 A1 | 7/2010 | Mejdrich et al. |
| 2010/0194751 A1* | 8/2010 | Wald ....................... G06T 15/06 345/426 |
| 2010/0286972 A1 | 11/2010 | Callegari |
| 2013/0063436 A1 | 3/2013 | Li |
| 2013/0112407 A1* | 5/2013 | Cheng .................... G01V 11/00 166/250.15 |
| 2013/0198669 A1 | 8/2013 | Gao et al. |

OTHER PUBLICATIONS

International Preliminary Report on Patentability for the equivalent International patent application PCT/US2016/037477 dated Dec. 28, 2017.

International Search Report and Written Opinion for the equivalent International patent application PCT/US2016/037477 dated Sep. 28, 2016.

* cited by examiner

*FIG. 4.2*

EFFICIENT ALGORITHMS FOR VOLUME VISUALIZATION ON IRREGULAR GRIDS

CROSS REFERENCE TO RELATED APPLICATIONS

This application is a national stage application of, and therefore claims benefit of, PCT Application No. PCT/US2016/037477 filed Jun. 15, 2016, entitled, "EFFICIENT ALGORITHMS FOR VOLUME VISUALIZATION ON IRREGULAR GRIDS."

This application claims priority from U.S. Provisional Patent Application No. 62/182,415 filed Jun. 19, 2015, entitled "EFFICIENT ALGORITHMS FOR VOLUME VISUALIZATION ON GEOMETRIC GRIDS." This application claims priority from U.S. Provisional Patent Application No. 62/184,782 filed Jun. 25, 2015, entitled "EFFICIENT ALGORITHMS FOR VOLUME VISUALIZATION ON GEOMETRIC GRIDS."

BACKGROUND

Oil and gas industry is using increasingly sophisticated data acquisition techniques to produce more and more volumetric datasets. The datasets may be visualized and interpreted using various software applications. Volume visualization is a technique for visualizing data associated with a gridded volume, enabling filtering and classification methods. However, when the data, such as geological data or model properties, is associated with an irregular grid, the computation cost of the visualization may become time prohibitive.

SUMMARY

In general, in one aspect, an embodiment of efficient algorithms for volume visualization on irregular grids includes a method for raycasting based on an irregular grid. The method includes raycasting, in a static mode, rays based on the irregular grid to generate a static image of a three dimensional (3D) volume dataset. The 3D volume dataset includes a plurality of irregular grid cells based on the irregular grid. The method further includes reducing a tally of the rays to generate a reduced tally of rays based on a rendering time of the static image and an animation frame rate, and generating, in a dynamic mode, an animation of the 3D volume dataset at the animation frame rate by at least performing raycasting based on the reduced tally of rays.

Other aspects will be apparent from the following description and the appended claims.

BRIEF DESCRIPTION OF DRAWINGS

The appended drawings illustrate several embodiments of efficient algorithms for volume visualization on irregular grids and are not to be considered limiting of its scope, for efficient algorithms for volume visualization on irregular grids may admit to other equally effective embodiments.

FIG. 1.1 is a schematic view, partially in cross-section, of a field in which one or more embodiments of efficient algorithms for volume visualization on irregular grids may be implemented.

FIG. 1.2 shows a schematic diagram of a system in accordance with one or more embodiments.

FIGS. 2.1, 2.2, and 2.3 show a flowchart in accordance with one or more embodiments.

FIGS. 3.1, 3.2, 3.3, 3.4, and 3.5 show an example in accordance with one or more embodiments.

FIGS. 4.1 and 4.2 show systems in accordance with one or more embodiments.

DETAILED DESCRIPTION

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that one or more embodiments may be practiced without these specific details. In other instances, well-known features have not been described in detail to avoid unnecessarily complicating the description.

In general, embodiments provide a method and system for performing raycasting based on an irregular grid. In one or more embodiments, a collection of rays is raycasted, based on the irregular grid and in a static mode, to generate a static image of a three dimensional (3D) volume dataset, the 3D volume dataset having irregular grid cells based on the irregular grid. A tally of the collection of rays is then reduced to generate a reduced tally of rays based on a rendering time of the static image and an animation frame rate. Subsequently, an animation of the 3D volume dataset is generated at the animation frame rate by at least performing raycasting in a dynamic mode and based on the reduced tally of rays. Accordingly, a field operation is performed in response to generating the animation of the 3D volume dataset for user visualization. By dynamically determining the tally of rays and rendering the animation accordingly, one or more embodiments increase the speed and improve the efficiency of the computer system.

Figure 11:
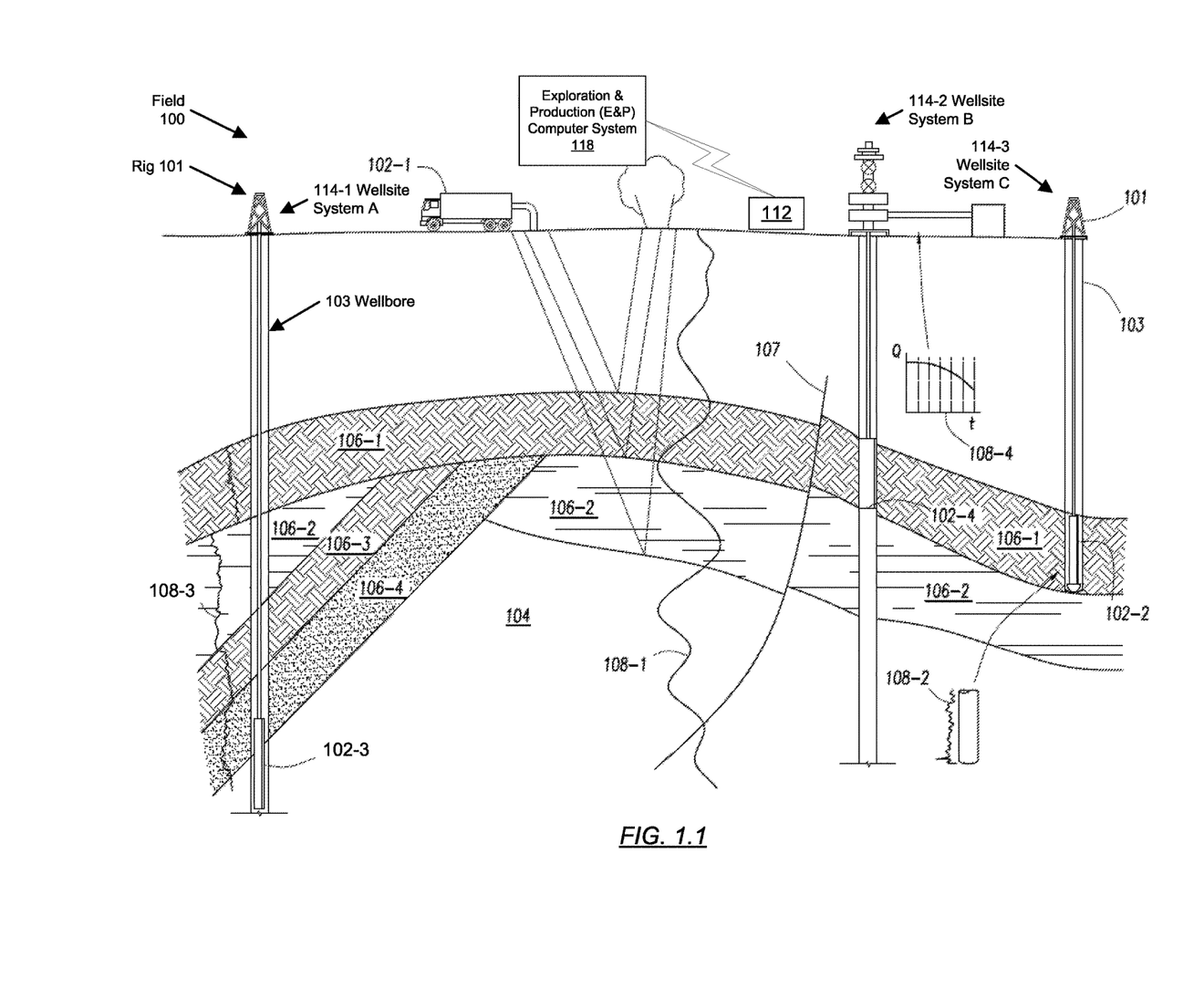

FIG. 1.1 depicts a schematic view, partially in cross section, of a field (100) in which one or more embodiments of efficient algorithms for volume visualization on irregular grids may be implemented. In one or more embodiments, one or more of the modules and elements shown in FIG. 1.1 may be omitted, repeated, and/or substituted. Accordingly, embodiments of efficient algorithms for volume visualization on irregular grids should not be considered limited to the specific arrangements of modules shown in FIG. 1.1.

As shown in FIG. 1.1, the field (100) includes the subterranean formation (104), data acquisition tools (102-1), (102-2), (102-3), and (102-4), wellsite system A (114-1), wellsite system B (114-2), wellsite system C (114-3), a surface unit (112), and an exploration and production (E&P) computer system (118). The subterranean formation (104) includes several geological structures, such as a sandstone layer (106-1), a limestone layer (106-2), a shale layer (106-3), a sand layer (106-4), and a fault line (107). In particular, these geological structures form at least one reservoir containing fluids, such as hydrocarbon.

In one or more embodiments, data acquisition tools (102-1), (102-2), (102-3), and (102-4) are positioned at various locations along the field (100) for collecting data of the subterranean formation (104), referred to as survey operations. In particular, the data acquisition tools are adapted to measure the subterranean formation (104) and detect the characteristics of the geological structures of the subterranean formation (104). For example, data plots (108-1), (108-2), (108-3), and (108-4) are depicted along the field (100) to demonstrate the data generated by the data acquisition tools. Specifically, the static data plot (108-1) is a seismic two-way response time. Static data plot (108-2) is core sample data measured from a core sample of the subterranean formation (104). Static data plot (108-3) is a logging trace, referred to as a well log. Production decline curve or graph (108-4) is a dynamic data plot of the fluid flow rate over time. Other data may also be collected, such as historical data, analyst user inputs, economic information, and/or other measurement data and other parameters of interest.

Further as shown in FIG. 1.1, each of the wellsite system A (114-1), wellsite system B (114-2), and wellsite system C (114-3) is associated with a rig, a wellbore, and other wellsite equipment configured to perform wellbore operations, such as logging, drilling, fracturing, production, or other applicable operations. For example, the wellsite system A (114-1) is associated with a rig (101), a wellbore (103), and drilling equipment to perform drilling operation. Similarly, the wellsite system B (114-2) and wellsite system C (114-3) are associated with respective rigs, wellbores, other wellsite equipments, such as production equipment and logging equipment to perform production operations and logging operations, respectively. Generally, survey operations and wellbore operations are referred to as field operations of the field (100). In addition, data acquisition tools and wellsite equipments are referred to as field operation equipments. The field operations are performed as directed by a surface unit (112). For example, the field operation equipment may be controlled by a field operation control signal that is sent from the surface unit (112).

In one or more embodiments, the surface unit (112) is operatively coupled to the data acquisition tools (102-1), (102-2), (102-3), (102-4), and/or the wellsite systems. In particular, the surface unit (112) is configured to send commands to the data acquisition tools (102-1), (102-2), (102-3), (102-4), and/or the wellsite systems and to receive data therefrom. In one or more embodiments, the surface unit (112) may be located at the wellsite system A (114-1), wellsite system B (114-2), wellsite system C (114-3), and/or remote locations. The surface unit (112) may be provided with computer facilities (e.g., an E&P computer system (118)) for receiving, storing, processing, and/or analyzing data from the data acquisition tools (102-1), (102-2), (102-3), (102-4), the wellsite system A (114-1), wellsite system B (114-2), wellsite system C (114-3), and/or other parts of the field (100). The surface unit (112) may also be provided with or have functionally for actuating mechanisms at the field (100). The surface unit (112) may then send command signals to the field (100) in response to data received, stored, processed, and/or analyzed, for example to control and/or optimize various field operations described above.

In one or more embodiments, the surface unit (112) is communicatively coupled to the E&P computer system (118). In one or more embodiments, the data received by the surface unit (112) may be sent to the E&P computer system (118) for further analysis. Generally, the E&P computer system (118) is configured to analyze, model, control, optimize, or perform management tasks of the aforementioned field operations based on the data provided from the surface unit (112). In one or more embodiments, the E&P computer system (118) is provided with functionality for manipulating and analyzing the data, such as performing simulation, planning, and optimization of production operations of the wellsite system A (114-1), wellsite system B (114-2), and/or wellsite system C (114-3). In one or more embodiments, the result generated by the E&P computer system (118) may be displayed for an analyst user to view the result in a two dimensional (2D) display, three dimensional (3D) display, or other suitable displays. Although the surface unit (112) is shown as separate from the E&P computer system (118) in FIG. 1.1, in other examples, the surface unit (112) and the E&P computer system (118) may also be combined.

Although FIG. 1.1 shows a field (100) on the land, the field (100) may be an offshore field. In such a scenario, the subterranean formation may be in the sea floor. Further, field data may be gathered from the field (100) that is an offshore field using a variety of offshore techniques for gathering field data.

Figure 12:
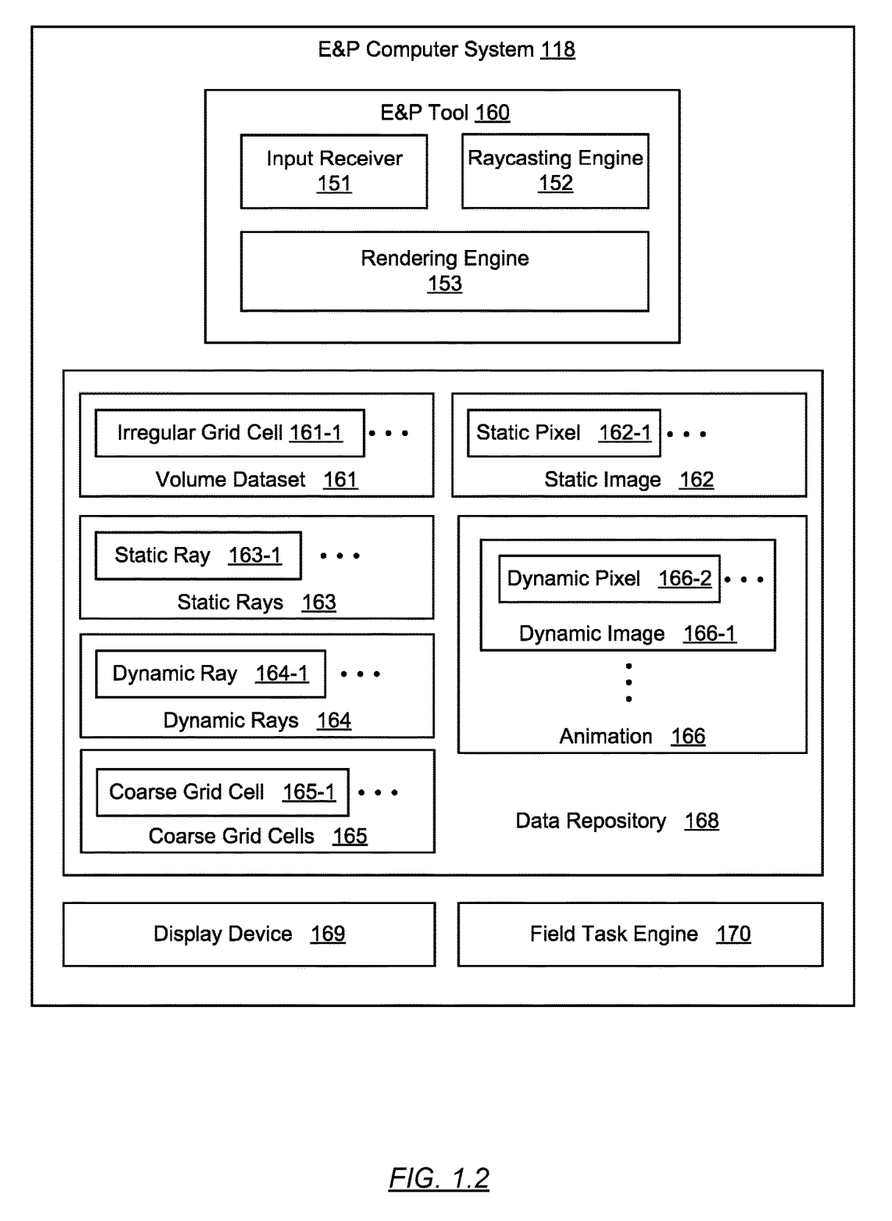

FIG. 1.2 shows more details of the E&P computer system (118) in which one or more embodiments of efficient algorithms for volume visualization on irregular grids may be implemented. In one or more embodiments, one or more of the modules and elements shown in FIG. 1.2 may be omitted, repeated, and/or substituted. Accordingly, embodiments of efficient algorithms for volume visualization on irregular grids should not be considered limited to the specific arrangements of modules shown in FIG. 1.2.

As shown in FIG. 1.2, the E&P computer system (118) includes an E&P tool (160), a data repository (168) for storing intermediate data and resultant outputs of the E&P tool (160), a display device (169) for displaying outputs of the E&P tool (160), and a field task engine (170) for performing various tasks of the field operation. In one or more embodiments, the display device (169) may be a 2D or 3D display device based on liquid crystal display, cathode ray tube, plasma display, or other display technology. In one or more embodiments, the data repository (168) may include one or more disk drive storage devices, one or more semiconductor storage devices, other suitable computer data storage devices, or combinations thereof. In one or more embodiments, content stored in the data repository (168) may be stored as a data file, a linked list, a data sequence, a database, a graphical representation, any other suitable data structure, or combinations thereof.

In one or more embodiments, the intermediate data and resultant outputs of the E&P tool (160) include the volume dataset (161), static image (162), static rays (163), dynamic rays (164), coarse grid cells (165), and animation (166). The volume dataset (161) includes a collection of data items of the field (100), where each data item is assigned to a point/position in a 3D volume and corresponds to a location in the field (100). Accordingly, the volume dataset (161) is a 3D volume dataset. In one or more embodiments, the volume dataset (161) includes results generated by a data acquisition tool, such as the data acquisition tool (102-3) depicted in FIG. 1.1 above. For example, each data item may include a seismic data item where the 3D volume corresponds to a region of the field (100).

In one or more embodiments, the volume dataset (161) is based on an irregular grid. In other words, the data items are assigned to points/positions in the 3D volume based on the irregular grid. As used herein, a regular grid is a grid having congruent grid cells and an irregular grid is a grid having non-congruent (i.e., irregular) grid cells (e.g., irregular grid cell (161-1), etc.). Each cell in an irregular grid may be different in size and/or shape from other cells in the irregular grid, whereby the differences between cells do not follow a spatial pattern. The regular grid addresses each grid cell by an index (i, j, k) and addresses a vertex of each grid cell by the coordinates (i*dx, j*dy, k*dz) where dx, dy, and dz represent the 3D size of the congruent regular grid cells. In other words, the coordinates of a regular grid cell are determined directly from the index of the grid cell without searching in any mapping data structure. In contrast, no direct mapping exists between the irregular grid cell coordinates and the irregular grid cell indices for the irregular grid. In other words, the coordinates of an irregular grid cell (e.g., irregular grid cell (161-1), etc.) are determined from the index of the irregular grid cell (e.g., irregular grid cell (161-1), etc.) by searching a mapping data structure (not shown). The storage of the unstructured grids may use a list of the connectivity which specifies the way a given set of vertices make up individual cells.

In one or more embodiments, the volume dataset (161) occupies a portion of the irregular grid. The irregular grid cells (e.g., irregular grid cell (161-1), etc.) in the irregular grid that are associated with data items of the 3D volume dataset (312) are referred to as active cells. In particular, the data item values of active cells are mapped to non-zero values based on a raycasting transfer function described below. In contrast, the irregular grid cells in the irregular grid that are not associated with data items of the 3D volume dataset (312) or having data items whose values are mapped to zero opacity based on the raycasting transfer function are referred to as inactive cells.

In one or more embodiments, the static rays (163) (e.g., static ray (163-1)) are paths originating from a single point (referred to as the ray source) to traverse respective directions through the volume dataset (161) in a static mode of the raycasting. In particular, the static rays (163) are used in a raycasting algorithm to generate a static image (e.g., static image (162)) of the volume dataset (161). In one or more embodiments, a raycasting algorithm is an algorithm where a ray traverses through the grid using the cell connectivity to track the cells traversed by a single ray. In general, a static image is an image of the volume dataset (161) when the ray source is stationary without creating any visual motion (e.g., panning, rotating, etc.) of the image. For example, raycasting the static ray (163-1) is the act of traversing the path of the static ray (163-1) while accumulating a color and an opacity based on a raycasting transfer function. In one or more embodiments, the raycasting transfer function maps the data item associated with each irregular grid cell (e.g., irregular grid cell (161-1), etc.) to a color value and an opacity value. The raycasting algorithm aggregates the color values and the opacity values of traversed irregular grid cells (e.g., irregular grid cell (161-1), etc.) along the path of the static ray (163-1) to generate a cumulative color value and a cumulative opacity value. The cumulative color value and cumulative opacity value increase as the irregular grid cell traversal progresses from the ray source onward. The final color value and final opacity value at the end of traversing the path of the static ray (163-1) are referred to as the color and opacity of raycasting the static ray (163-1). In one or more embodiments, the color and opacity of raycasting the static ray (163-1) are assigned to a point where the static ray (163-1) intersects a 2D plane to form the static image (162). In other words, the static image (162) is a collection of the colors and opacities of raycasting the static rays (163).

In one or more embodiments, the dynamic rays (164) (e.g., dynamic ray (164-1)) are paths originating from the ray source to traverse respective directions through the volume dataset (161) in a dynamic mode of the raycasting. In particular, the dynamic rays (164) are used in the raycasting algorithm to generate a dynamic image (e.g., dynamic image (166-1)) of the volume dataset (161). In general, a dynamic image is an image of the volume dataset (161) when the ray source is moving to create a visual motion (e.g., panning, rotating, etc.) of the image. Similar to the static image (162), the color and opacity of raycasting the dynamic ray (164-1) are assigned to a point where the dynamic ray (164-1) intersects a 2D plane to form the dynamic image (166-1). In other words, the dynamic image (166-1) is a collection of the colors and opacities of raycasting the dynamic rays (164). In one or more embodiments, the animation (166) is a sequence of dynamic images (e.g., dynamic image (166-1), etc.) that are generated in real time based on a target frame rate of the animation (166).

In one or more embodiments, the coarse grid cells (165) (e.g., coarse grid cell (165-1)) are grid cells based on a grid having a coarser granularity than the irregular grid of the volume dataset (161). For example, the coarse grid cell (165-1) may include multiple irregular grid cells, such as the irregular grid cell (161-1). In one or more embodiments, the coarse grid cells (165) (e.g., coarse grid cell (165-1)) are based on a regular grid and have congruent grid cells. In one or more embodiments, the coarse grid cells (165) (e.g., coarse grid cell (165-1)) are based on an irregular grid and have non-congruent grid cells. In one or more embodiments, the coarse grid cells (165) (e.g., coarse grid cell (165-1)) are used in the raycasting to reduce computational resources and resultant computing time. Each of the coarse grid cells (165) (e.g., coarse grid cell (165-1)) stores information such as the minimum and maximum data item values and active/inactive status for the irregular grid cells within the coarse grid cell. The coarse grid cell that contains at least one active cell is referred to as an active coarse grid cell. The coarse grid cell that contains no active cell is referred to as an inactive coarse grid cell.

An example of the volume dataset (161), static image (162), static rays (163), dynamic rays (164), coarse grid cells (165), and animation (166) is described in reference to FIGS. 3.1-3.5 below.

In one or more embodiments, the E&P tool (160) includes the input receiver (151), the raycasting engine (152), and the rendering engine (153). Each of these components of the E&P tool (160) is described below.

In one or more embodiments, the input receiver (151) is configured to obtain the volume dataset (161). In one or more embodiments, the input receiver (151) obtains the volume dataset (161) from the surface unit (112) depicted in FIG. 1.1 above. For example, the input receiver (151) may obtain the volume dataset (161) inputs intermittently, periodically, in response to a user activation, or as triggered by an event. Accordingly, the intermediate and final results of the raycasting engine (152) and the rendering engine (153) may be generated intermittently, periodically, in response to a user activation, or as triggered by an event.

Figure 21:
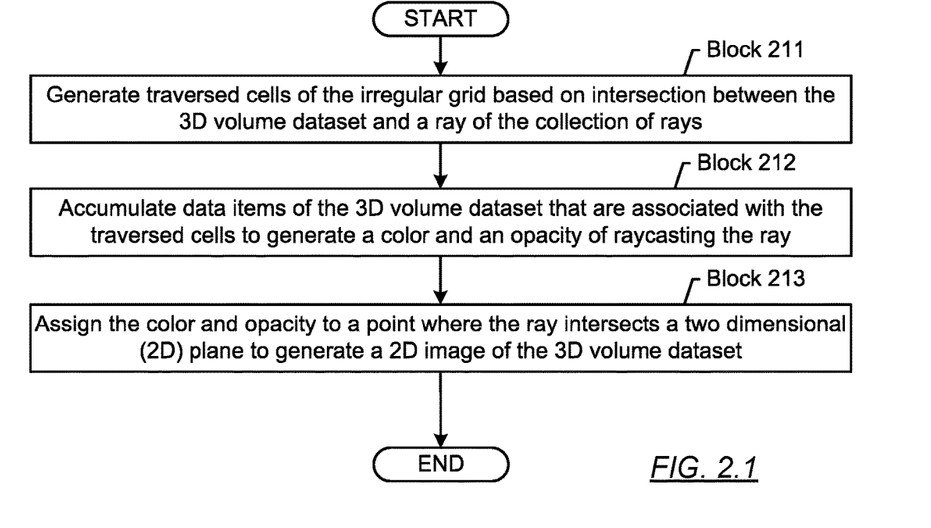
Figure 23:
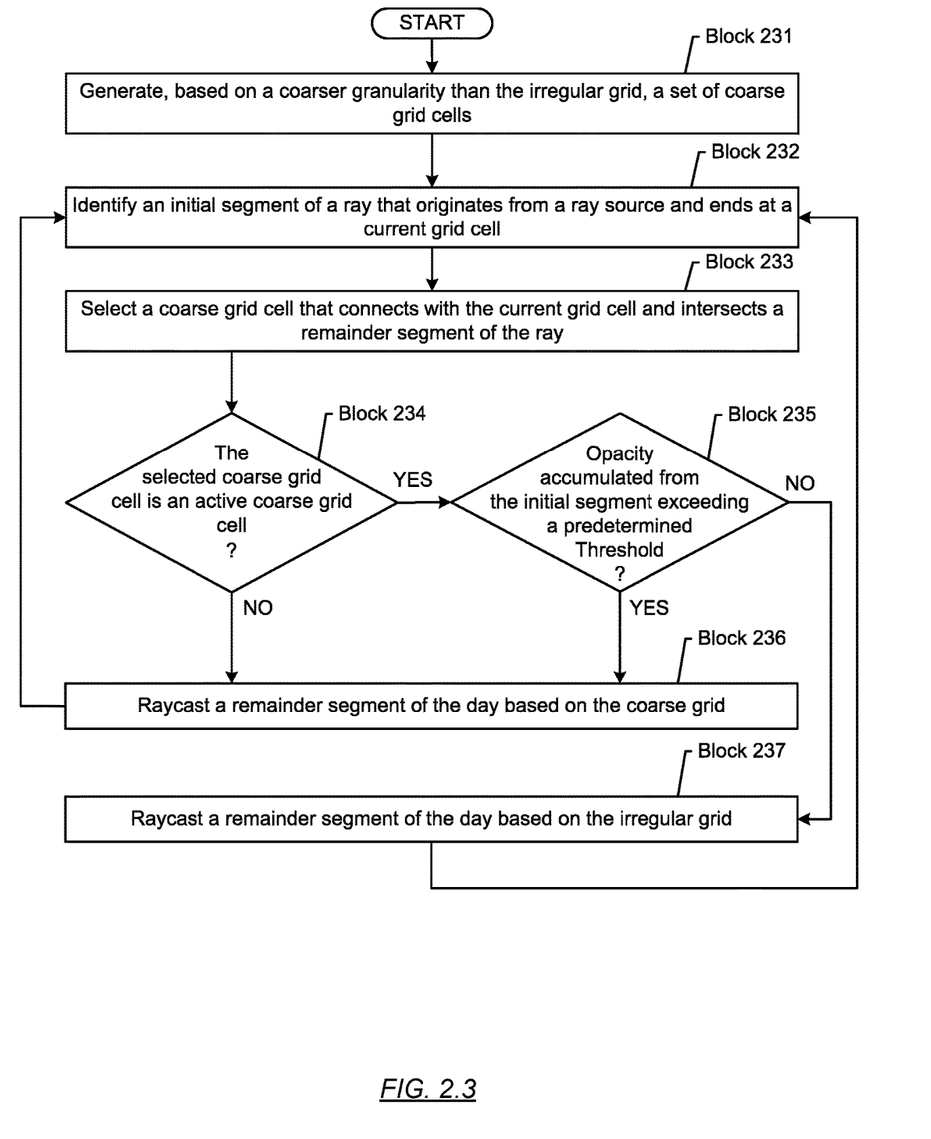

In one or more embodiments, the raycasting engine (152) is configured to generate the static image (162) and the animation (166) of the volume dataset (161). In one or more embodiments, the raycasting engine (152) generates the static image (162) using a raycasting algorithm based on the static rays (163). Specifically, the static image (162) is projected by the static rays (163) traversing the volume dataset (161) onto a 2D plane. In one or more embodiments, the static rays (163) are algorithmically generated using the raycasting algorithm based on a pre-determined resolution of the static image (162). In one or more embodiments, the raycasting algorithm is described in reference to FIG. 2.1 below. In one or more embodiments, the raycasting algorithm includes a ray traversal algorithm described in reference to FIG. 2.3 below.

Figure 22:
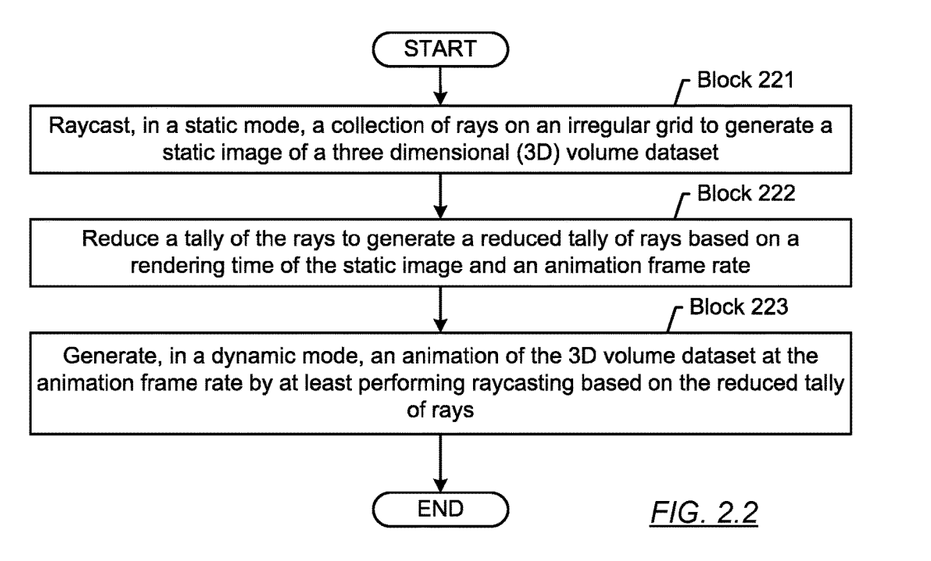

In one or more embodiments, the raycasting engine (152) generates the dynamic image (166-1) of the animation (166) using the raycasting algorithm based on the dynamic rays (163). Specifically, the dynamic image (166-1) is projected by the dynamic rays (163) traversing the volume dataset (161) to the 2D plane. In one or more embodiments, the dynamic rays (163) are algorithmically generated using the raycasting algorithm based on a reduction factor and the pre-determined resolution of the static image (162). In particular, the reduction factor is generated by the raycasting engine (152) using a modified raycasting algorithm based on a rendering time of the static image (162) and a target frame rate of the animation (166). In one or more embodiments, the modified raycasting algorithm is described in reference to FIG. 2.2 below. In one or more embodiments, the modified raycasting algorithm includes the ray traversal algorithm described in reference to FIG. 2.3 below.

An example of generating the static image (162) and the dynamic image (166-1) using the modified raycasting algorithm is described in reference to FIGS. 3.1-3.5 below.

In one or more embodiments, the rendering engine (153) is configured to generate a 2D or 3D display image based on the output of the raycasting engine (152). The 2D or 3D display image is provided to the display device (169) and displayed to a user. In one or more embodiments, the display image is the static image (162) or the dynamic image (166-1). In one or more embodiments, the rendering engine (153) generates the animation (166) by generating a sequence of dynamic images (e.g., dynamic image (166-1), etc.) based on the target frame rate of the animation (166). Accordingly, the user may view the data items of the volume dataset (161) in the static image (162) and/or the animation (166).

In one or more embodiments, the E&P computer system (118) includes the field task engine (170) that is configured to generate a field operation control signal based at least on a result generated by the E&P tool (160), such as based on a user input in response to displaying the 2D or 3D image described above. As noted above, the field operation equipment depicted in FIG. 1.1 above may be controlled by the field operation control signal. For example, the field operation control signal may be used to control drilling equipment, an actuator, a fluid valve, or other electrical and/or mechanical devices disposed about the field (100) depicted in FIG. 1.1 above. In particular, the field planning operation, drilling operation, production operation, etc., may be performed based on the volume dataset (161) viewed as the static image (162) and/or the animation (166).

Figure 41:
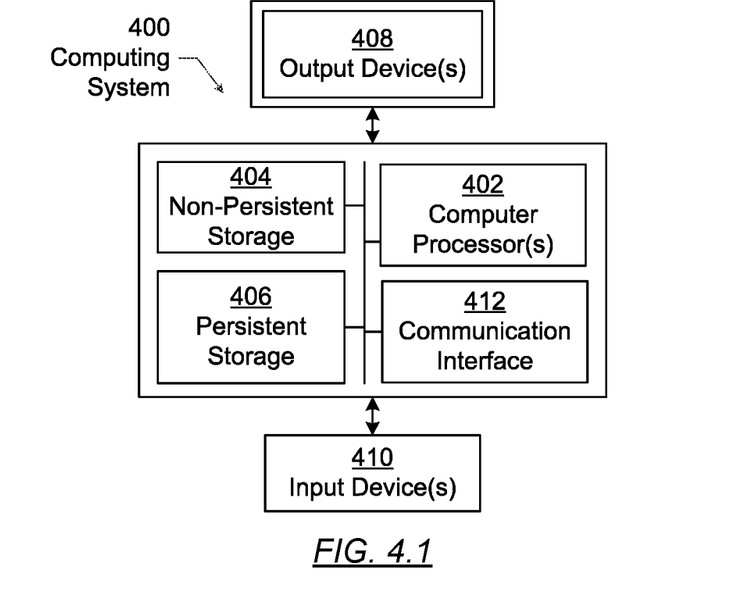
Figure 42:
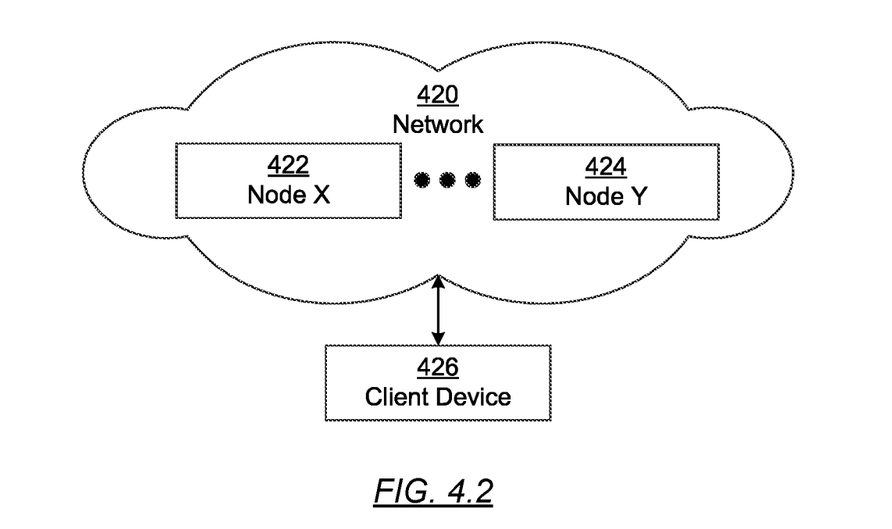

The E&P computer system (118) may include one or more system computers, such as shown in FIGS. 4.1 and 4.2 below, which may be implemented as a server or any conventional computing system. However, those skilled in the art, having benefit of this disclosure, will appreciate that implementations of various technologies described herein may be practiced in other computer system configurations, including hypertext transfer protocol (HTTP) servers, hand-held devices, multiprocessor systems, microprocessor-based or programmable consumer electronics, network personal computers, minicomputers, mainframe computers, and the like.

While specific components are depicted and/or described for use in the units and/or modules of the E&P computer system (118) and the E&P tool (160), a variety of components with various functions may be used to provide the formatting, processing, utility and coordination functions for the E&P computer system (118) and the E&P tool (160). The components may have combined functionalities and may be implemented as software, hardware, firmware, or combinations thereof.

FIGS. 2.1, 2.2, and 2.3 depict an example method in accordance with one or more embodiments. For example, the method depicted in FIGS. 2.1, 2.2, and 2.3 may be practiced using the E&P computer system (118) described in reference to FIGS. 1.1 and 1.2 above. In one or more embodiments, one or more of the elements shown in FIGS. 2.1, 2.2, and 2.3 may be omitted, repeated, and/or performed in a different order. Accordingly, embodiments of efficient algorithms for volume visualization on irregular grids should not be considered limited to the specific arrangements of elements shown in FIGS. 2.1, 2.2, and 2.3.

FIG. 2.1 shows an example flowchart for raycasting a collection of rays to generate a 2D image of a 3D volume dataset. In one or more embodiments, the raycasting is performed in a static mode to generate a static 2D image. In one or more embodiments, the raycasting is performed in a dynamic mode to generate a dynamic 2D image of an animation.

Initially in Block 211, traversed cells of an irregular grid of the 3D volume dataset are generated based on intersection between the 3D volume dataset and a ray of the collection of rays. In one or more embodiments, the traversed cells include the irregular grid cells of the 3D volume dataset that are intersected by the ray.

In Block 212, data items of the 3D volume dataset that are associated with the traversed cells are accumulated to generate a color and an opacity of raycasting the ray. In one or more embodiments, each data item associated with an irregular grid cell of the 3D volume dataset is mapped to a color value and an opacity value using a raycasting transfer function. Accordingly, the color values and opacity values of the traversed cells are aggregated (e.g., summed) to generate the color and the opacity of raycasting the ray.

In Block 213, the color and the opacity values of raycasting the ray are assigned to a point where the ray intersects a 2D plane to generate the 2D image of the 3D volume dataset. In one or more embodiments, the 2D plane is a 2D surface selected based on a viewing angle and is between the ray source and the 3D volume dataset.

FIG. 2.2 shows an example flowchart for raycasting a collection of dynamic rays in a dynamic mode to generate an animation of a 3D volume dataset. Initially in Block 221, a collection of static rays is raycasted in a static mode based on an irregular grid to generate a static image of the 3D volume dataset. In one or more embodiments, the collection of static rays is raycasted using the method described in reference to FIG. 2.1 above.

In Block 222, a tally of the collection of static rays is reduced to generate a reduced tally of rays based on a rendering time of the static image and a target frame rate of the animation. In one or more embodiments, a reduction factor is determined by at least multiplying the target frame rate of the animation and the rendering time of the static image. Accordingly, the tally (e.g., number count) of static rays is reduced by the reduction factor to generate the reduced tally of rays.

In Block 223, the animation of the 3D volume dataset is generated by at least performing raycasting based on the reduced tally of rays. In one or more embodiments, a collection of dynamic rays is generated by reducing the collection of static rays based on the reduction factor. In one or more embodiments, a collection of dynamic rays is algorithmically generated based on the reduced tally of rays. Accordingly, the collection of dynamic rays is raycasted in the dynamic mode based on the irregular grid to generate a dynamic image of the 3D volume dataset. In one or more embodiments, the collection of dynamic rays is raycasted using the method described in reference to FIG. 2.1 above. In one or more embodiments, the animation is generated by generating a sequence of dynamic images in real time based on the target frame rate. In one or more embodiments, the target frame rate is adjusted to improve quality of the animation based on actual rendering time of each dynamic image.

FIG. 2.3 shows an example flowchart for performing raycasting of a 3D volume dataset using a modified raycasting algorithm.

Initially in Block 231, a set of coarse grid cells is generated based on a coarser granularity than an irregular grid of the 3D volume dataset. In other words, the set of coarse grid cells is based on a coarse grid. In one or more embodiments, the coarse grid is a regular grid. In one or more embodiments, the set of coarse grid cells includes active coarse grid cells and inactive coarse grid cells. In particular, each active coarse grid cell contains at least one active irregular cell. Each inactive coarse grid cell contains no active irregular cell.

In Block 232, an initial segment of a ray is identified that originates from a ray source and ends at a current grid cell. In one or more embodiments, raycasting is performed by traversing a sequence of grid cells intersected by a path of the ray. The raycasting progresses through one grid cell at a time starting from the ray source. At any point of time during the raycasting, the portion of the ray from the ray source to the grid cell currently being processed is identified as the initial segment. The portion of the ray not included in the initial segment is referred to as the remainder segment. In one or more embodiments, a portion of the raycasting is based on the irregular grid while the other portion of the raycasting is based on the coarse grid. Accordingly, the current grid cell is an irregular grid cell if the raycasting is currently performed based on the irregular grid. Otherwise, the current grid cell is a coarse grid cell if the raycasting is currently performed based on the coarse grid.

In Block 233, a coarse grid cell that connects with the current grid cell and intersects the remainder segment of the ray is selected from the set of coarse grid cells. In an example scenario, the current grid cell is an irregular grid cell and the selected coarse grid cell includes the current irregular grid cell and overlaps the remainder segment. In another example scenario, the current grid cell is a coarse grid cell and the selected coarse grid cell adjoins the current coarse grid cell and overlaps the remainder segment.

In Block 234, a determination is made as to whether the selected coarse grid cell is an active coarse grid cell. If the determination is positive, i.e., the selected coarse grid cell is an active coarse grid cell and includes at least one active irregular grid cell, the method proceeds to Block 235. If the determination is negative, i.e., the selected coarse grid cell is an inactive coarse grid cell and does not include any active irregular grid cells, the method proceeds to Block 236.

In Block 235, a determination is made as to whether the opacity of raycasting the initial segment exceeds a pre-determined threshold. As noted above, raycasting the initial segment is the act of accumulating color values and opacity values from the initial segment. If the determination is positive, i.e., the opacity accumulated from the initial segment exceeds the pre-determined threshold, the method proceeds to Block 236. If the determination is negative, i.e., the opacity accumulated from the initial segment does not exceed the pre-determined threshold, the method proceeds to Block 237 to raycast the remainder segment based on the irregular grid. In other words, the color value and opacity value of a subsequent irregular grid cell is added to the already accumulated color and opacity from the initial segment and the method returns to Block 232. Specifically, the subsequent irregular grid cell is an irregular grid cell intersected by the ray in a subsequent position to the current grid cell identified in Block 232 above. The subsequent irregular grid cell becomes the current grid cell after returning to Block 232.

In Block 236, the remainder segment of the ray is raycasted based at least on the set of coarse grid cells. In other words, the color value and opacity value of the selected coarse grid cell are added to the already accumulated color and opacity values from the initial segment and the method returns to Block 232. The selected coarse grid cell becomes the current grid cell after returning to Block 232.

As noted above, the data item associated with a coarse grid cell is based on a statistical measure (e.g., mean, median, root-mean-squared, or other types of statistical average) of the data items associated with the irregular grid cells included in the coarse grid cell. In one or more embodiments, the data item associated with the coarse grid cell includes a normalized color value and normalized opacity value. For example, the normalized color and opacity values represent a normalized sum of data items, of irregular grid cells included in the coarse grid cell, divided by a normalization factor of the coarse grid cell. In another example, the normalized color value is equivalent to the sum of color values, of irregular grid cells included in the coarse grid cell, divided by a color normalization factor of the coarse grid cell. Similarly, the normalized opacity value is equivalent to the sum of opacity values, of irregular grid cells included in the coarse grid cell, divided by an opacity normalization factor of the coarse grid cell.

FIGS. 3.1, 3.2, 3.3, 3.4, and 3.5 show an example in accordance with one or more embodiments. In one or more embodiments, the example shown in these figures may be practiced using the E&P computer system shown in FIGS. 1.1 and 1.2 and the method described in reference to FIGS. 2.1, 2.2, and 2.3 above. The following example is for explanatory purposes and not intended to limit the scope of the claims.

Figure 31:
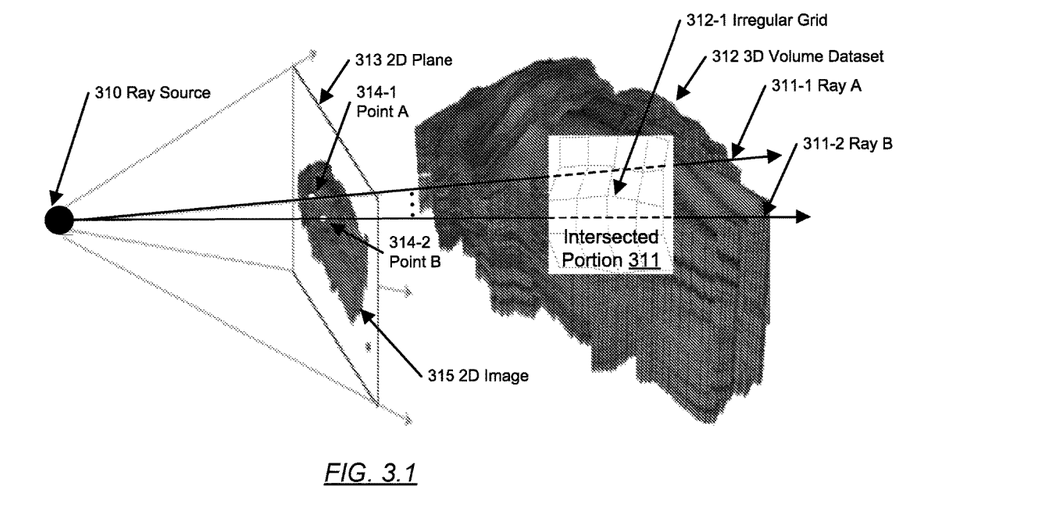

FIG. 3.1 shows an example of performing raycasting based on an irregular grid. A collection of rays (e.g., ray A (311-1), ray B (311-2), etc.) are projected from a ray source (310) through a 3D volume dataset (312). The 3D volume dataset (312) includes an irregular grid (312-1) partially shown inside an intersected portion (311) of the 3D volume dataset (312). For illustration purposes, the intersected portion (311) is an intersection between the 3D volume dataset (312) and a portion of the collection of rays (e.g., ray A (311-1), ray B (311-2), etc.). The collection of rays (e.g., ray A (311-1), ray B (311-2), etc.) further intersects a 2D plane (313) where a 2D image (315) of the 3D volume dataset (312) is projected by the collection of rays (e.g., ray A (311-1), ray B (311-2), etc.). In particular, the ray A (311-1) intersects the 2D plane (313) at the point A (314-1) where the color and opacity values of raycasting the ray A (314-1) are assigned. In other words, the color and opacity values of the point A (314-1) in the 2D image (315) are based on the color and opacity values that are generated by raycasting the ray A (311-1). Similarly, the ray B (311-2) intersects the 2D plane (313) at the point B (311-2) where the color and opacity values of raycasting the ray B (311-2) are assigned. In other words, the color and opacity values of the point B (314-2) in the 2D image (315) are based on the color and opacity that are generated by raycasting the ray B (311-2).

Figures 32, 34:
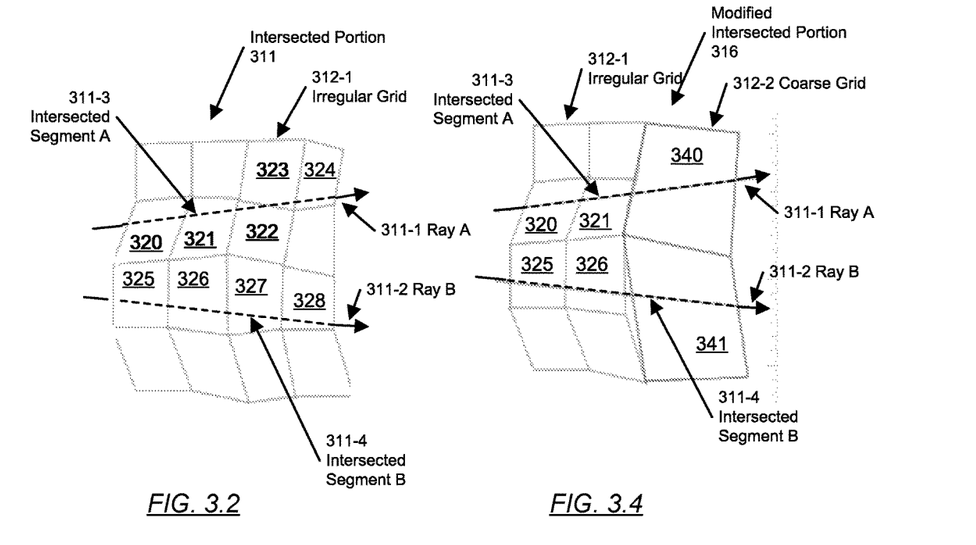

FIG. 3.2 shows details of the intersected portion (311) of the 3D volume dataset (312) where raycasting is performed based on the irregular grid (312-1) of the 3D volume dataset (312). The intersection of the ray A (311-1) and the 3D volume dataset (312) is shown as a dashed line segment denoted as the intersected segment A (311-3). In particular, the intersected segment A (311-3) intersects irregular grid cells (320), (321), (322), (323), and (324) of the 3D volume dataset (312). For example, the ray A (311-1) enters and exists the 3D volume dataset (312) at the irregular grid cells (320) and (324), respectively. Accordingly, the color and opacity values of raycasting the ray A (311-1) are generated by accumulating data items in the 3D volume dataset (312) that are associated with the irregular grid cells (320), (321), (322), (323), and (324).

Similarly, the intersection of the ray B (311-2) and the 3D volume dataset (312) is shown as a dashed line segment denoted as the intersected segment B (311-4). In particular, the intersected segment B (311-4) intersects irregular grid cells (325), (326), (327), and (328) of the 3D volume dataset (312). For example, the ray B (311-2) enters and exists the 3D volume dataset (312) at the irregular grid cells (325) and (328), respectively. Accordingly, the color and opacity values of raycasting the ray B (311-2) are generated by accumulating data items in the 3D volume dataset (312) that are associated with the irregular grid cells (325), (326), (327), and (328).

Although two rays and sixteen irregular grid cells are shown in FIG. 3.2 for illustration purposes, other raycasting examples may involve hundreds of thousands, millions, tens of millions, etc. of rays and irregular grid cells.

Figure 33:
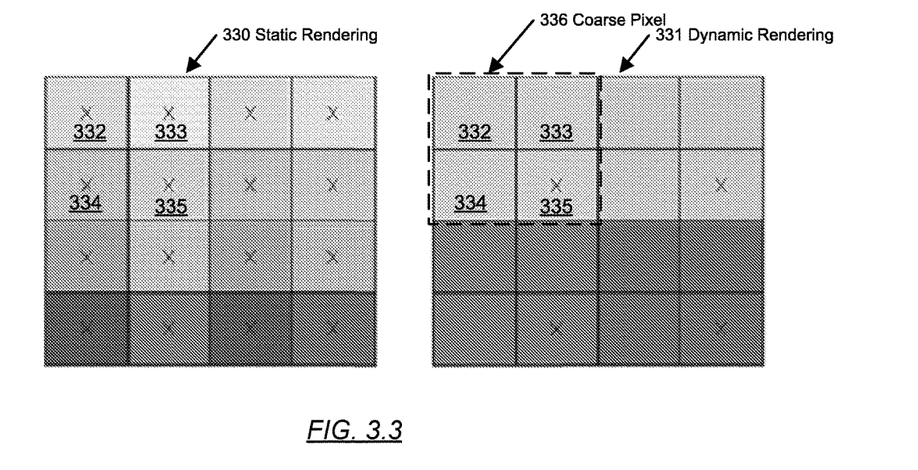

FIG. 3.3 shows a portion of the 2D image (315) that is rendered as a static rendering (330) in a static mode and rendered as a dynamic rendering (331) in a dynamic mode. In the static rendering (330), the portion of the 2D image (315) includes 16 pixels (e.g., pixels (332), (333), (334), (335), etc.) arranged in 4 rows with 4 pixels in each row. Each of these 16 pixels includes an X mark representing a ray intersecting the 2D plan (313) depicted in FIG. 3.1 above to project the 2D image (315). For example, the pixel (332) may correspond to the point A (314-1) depicted in FIG. 3.1 above where the ray A (311-1) intersects the 2D plan (313). In other words, the color and opacity values assigned to the pixel (332) are based on the color and opacity values that are generated by raycasting the ray A (314-1). Similarly, the pixel (335) may correspond to the point B (314-2) depicted in FIG. 3.1 above where the ray B (311-2) intersects the 2D plan (313). In other words, the color and opacity values assigned to the pixel (335) are based on the color and opacity values that are generated by raycasting the ray B (314-2).

In an example scenario, the 2D image (315) is initially a static image generated by raycasting the 3D volume dataset (312) in the static mode. The static rendering (330) is a portion of the static image. Subsequently, the 2D image (315) becomes a dynamic image in an animation sequence generated by raycasting the 3D volume dataset (312) in the dynamic mode. The dynamic rendering (331) is a portion of the dynamic image. For example, the animation sequence of the 2D image (315) may represent a panning and/or rotating operation of the 3D volume dataset (312) and/or the ray source (310), as initiated by a user. Generally, the user focuses on analyzing the 3D volume dataset (312) in the static mode when a high resolution and slower rendering time of the 2D image (315) are adequate. In contrast, the user generally focuses on a rapid response of the panning and/or rotating operation in the dynamic mode when a lower resolution and faster rendering time of the 2D image (315) are adequate.

The raycasting algorithm analyzes the rendering performance when in static mode to determine the number of rays used for raycasting in the dynamic mode to provide a responsive panning and/or rotating operation. For example, if raycasting the 3D volume dataset (312) with 2 million rays in the static mode takes 0.5 seconds to generate the static image, a 20 frames per second (FPS) target frame rate for the dynamic mode allocates 0.05 seconds to generate each dynamic image in the dynamic mode. Based on the ratio of 0.5 second/0.05 second, it is determined that 200,000 rays are to be used in raycasting the 3D volume dataset (312) in the dynamic mode. An example method to reduce the tally of rays from 2 million to 200,000 for the dynamic mode is to recursively cluster groups of 4 pixels until the reduction of rays is accomplished. For example, the 4 rays intersecting the pixels (332), (333), (334), and (335) in the static rendering (330) may be reduced to a single ray (e.g., ray B (311-2)) by clustering the four pixels (332), (333), (334), and (335) into a group for raycasting in the dynamic mode. For example, the color and opacity values of each of the four pixels (332), (333), (334), and (335) are based on the single color and single opacity of the pixel (335) generated by raycasting the ray B (311-2). In other words, the three rays (e.g., ray A (311-1), etc.) intersecting the pixels (332), (333), and (334) are discarded from being used in the raycasting in the dynamic mode. As a result, the dynamic rendering (331) includes groups of 4 pixels that have the same color and opacity.

In another example, the four pixels (332), (333), (334), and (335) are substituted by a coarse pixel (336) having the color and opacity based on the single color and single opacity of the pixel (335) generated by raycasting the ray B (311-2). In other words, the three rays (e.g., ray A (311-1), etc.) intersecting the pixels (332), (333), and (334) are discarded from being used in the raycasting in the dynamic mode. As a result, the dynamic rendering (331) includes four times fewer pixels (e.g., coarse pixel (336)) than the number of pixels (e.g., coarse pixel (336)) in the static rendering (330).

While the dynamic rendering (331) corresponds to a 4-time reduction in the number of rays used for the static rendering (330), further reduction is performed to accomplish the 10-time reduction described above to achieve the 20 FPS target frame rate of the dynamic mode. In other words, the dynamic rendering (331) is reduced in a subsequent recursive clustering of pixels. For example, the coarse pixel (336) may be further grouped with other coarse pixels into a coarser pixel (not shown) in the final dynamic image. The rendering time to generate the dynamic image based on the recursive pixel grouping may be monitored in the dynamic mode to ensure adequate animation performance. For example, the number of rays used for raycasting in the dynamic mode may be initially set based on the reduction factor described above and further adjusted based on the actual rendering time measured during the panning and/or rotating operation. In addition, the static mode may be interrupted upon receiving a panning and/or rotating command to allow a quick switch to the dynamic mode.

FIG. 3.4 shows details of a modified intersected portion (316) of the 3D volume dataset (312) where modified raycasting is performed based on coarsening the irregular grid (312-1) of the 3D volume dataset (312). The modified intersected portion (316) is the same portion of the 3D volume dataset (312) as the intersected portion (311) depicted in FIG. 3.1 above with the addition of a coarse grid (312-2) partially shown as having the irregular grid cells (340) and (341). While the irregular grid (312-1) (having the irregular grid cell (320), etc.) and the coarse grid (312-2) (having the coarse grid cell (340), etc.) superimpose each other throughout the space where the 3D volume dataset (312) is shown, the irregular grid (312-1) (having the irregular grid cell (320), etc.) and the coarse grid (312-2) (having the coarse grid cell (340), etc.) are partially shown as obscuring each other in FIG. 3.2 for illustration purposes.

During raycasting, in either the static mode or dynamic mode, as the ray A (311-1) originates from the ray source (310) to traverse through the 3D volume dataset (312), the color and opacity associated with the ray A (311-1) are accumulated. As the opacity accumulates, the remaining data in the 3D volume dataset (312) along the not-yet-traversed segment of the ray A (311-1) contributes less and less to the final color of the ray A (311-1). Once the opacity of the ray A (311-1) reaches a pre-determined threshold, the irregular grid (312-1) (having the irregular grid cell (320), etc.) is substituted by the coarse grid (312-2) (having the coarse grid cell (340), etc.) for the ray traversal to continue in the modified raycasting. For example, while the initial raycasting accumulates the color and opacity of the ray A (311-1) based on the data associated with the irregular grid cells (320), (321), (322), (323), and (324), the modified raycasting accumulates the color and opacity of the ray A (311-1) based on the data associated with the irregular grid cell (320) and (321), and the coarse grid cell (340). In other words, the opacity accumulated based on the irregular grid cell (320) and (321) equals or exceeds the pre-determined threshold. Accordingly, the irregular grid cells (322), (323), and (324) are substituted by the coarse grid cell (340) to continue the ray traversal of the ray A (311-1) in the modified raycasting.

Similarly, while the initial raycasting accumulates the color and opacity of the ray B (311-2) based on the data associated with the irregular grid cells (325), (326), (327), and (328), the modified raycasting accumulates the color and opacity of the ray B (311-2) based on the data associated with the irregular grid cells (325) and (326), and the coarse grid cell (341). In other words, the opacity accumulated based on the irregular grid cell (325) and (326) equals or exceeds the pre-determined threshold. Accordingly, the irregular grid cells (325) and (326) are substituted by the coarse grid cell (341) to continue the ray traversal of the ray B (311-2) in the modified raycasting.

The coarse grid (312-2) (having the coarse grid cell (340), etc.) reduces the number of cells to traverse and hence reduces the computational resource used and the computing time. The data item assigned to the coarse grid cell (341) is based on a statistical measure (e.g., mean, median, root-mean-squared, or other types of statistical average) of the data items associated with the irregular grid cells (322), (323), and (324) in the 3D volume dataset (312). The data item assigned to the coarse grid cell (341) may be normalized based on the number of substituted irregular grid cells. The grid substitution may be repeated with second and subsequent opacity thresholds. In other words, more than two different grids with coarser granularity levels than the initial irregular grid (312-1) may be used during ray traversal of the modified raycasting.

With conventional rendering techniques, generating coarsened grids is a non-trivial task, especially if the coarsened grids are seamlessly mixed with the initial grid and artifacts such as tears are to be avoided. One such technique is described in U.S. Pat. No. 8,194,068 B1, entitled "Hexahedral Finite Element Mesh Coarsening Using Pillowing Technique." However, a simple coarse grid may be used as the coarse grid (312-2) (having the coarse grid cells (340), (341), etc.) described above without any constraint to preserve topology. For example, the irregular grid cell (326) and the coarse grid cell (341) are separated by a gap that does not exist between the irregular grid cell (326) and the irregular grid cell (327). Although present, the gap does not noticeably affect the resulting 2D image.

Figure 35:
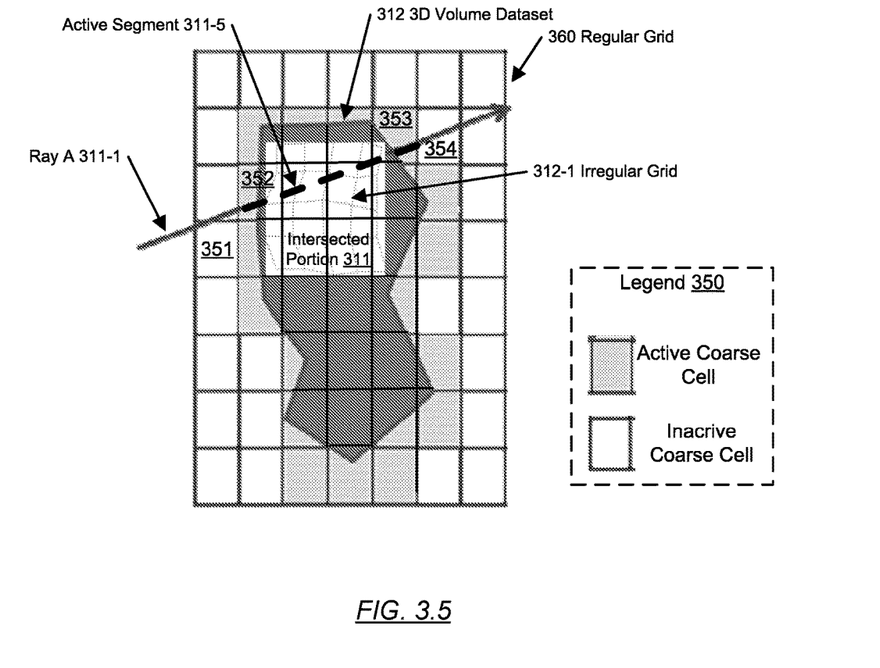

FIG. 3.5 shows details of a simplified view of the 3D volume dataset (312) where modified raycasting is performed based on coarsening the irregular grid (312-1) of the 3D volume dataset (312). The ray A (311-1) and 3D volume dataset (312) shown in FIG. 3.5 are simplified representations of the ray A (311-1) and 3D volume dataset (312) depicted in FIGS. 3.1 and 3.2 above.

The modified raycasting starts with identifying an active segment (311-5) of the ray A (311-1) based on the active segment (311-5) intersecting the 3D volume dataset (312). Separate from the active segment (311-5), the remainder of the ray A (311-1) (referred to as the inactive segment) is raycasted based on a coarsened grid, such as the regular grid (360). As shown in FIG. 3.5, the regular grid (360) at a coarser granularity superimposes the irregular grid (312-1) partially shown in the intersected portion (311) where the ray A (311-1) intersects the 3D volume dataset (312). Although only a few irregular grid cells are shown within a coarse grid cell of the regular grid (360) for illustration purposes, the coarse grid cell may contain hundreds, thousands, hundreds of thousands, etc. of irregular grid cells. As noted above, the grid cells in the irregular grid (312-1) that are associated with data items of the 3D volume dataset (312) are referred to as active cells. In particular, the data items values of active cells are mapped to non-zero values based on a raycasting transfer function. In contrast, the grid cells in the irregular grid (312-1) that are not associated with data items of the 3D volume dataset (312) or having data items whose values are mapped to zero opacity based on the raycasting transfer function are referred to as inactive cells. For example, the inactive cells (351) and (354) do not intersect the 3D volume dataset (312).

Each coarse grid cell of the regular grid (360) stores information such as the minimum and maximum data item values and active/inactive status for the irregular grid cells within a coarse grid cell. The coarse grid cell that contains at lease one active cell is referred to as an active coarse grid cell. The coarse grid cell that contains no active cell is referred to as an inactive coarse. The active coarse grid cells and inactive coarse grid cells are shown in FIG. 3.5 according to the legend (350). For example, the coarse grid cells (351) and (354) are inactive coarse grid cells that do not intersect the 3D volume dataset (312). The coarse grid cells (352) and (353) are active coarse grid cells that intersect 3D volume dataset (312). During the modified raycasting, the active coarse grid cells of the regular grid (360) are used to identify an active segment of the (311-5) of the ray A (311-1). The remainder portion of the ray A (311-1) is referred to as an inactive segment. The raycasting of the inactive segment is performed based on the regular grid (360). In other words, the ray traversal through the active segment (311-5) is based on the irregular grid (312-1) while the ray traversal through the inactive segment is based on the regular grid (360).

Each coarse grid cell may define a unit of work of raycasting. Based on the coarse grid cells of the regular grid (360), the raycasting computation may be distributed as units of work among computing nodes. Thus, multiple computing nodes may perform the raycasting in parallel, whereby each computing node is assigned a strict subset of the coarse grid.

Embodiments of efficient algorithms for volume visualization on irregular grids may be implemented on a computing system. Any combination of mobile, desktop, server, router, switch, embedded device, or other types of hardware may be used. For example, as shown in FIG. 4.1, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

The computing system (400) in FIG. 4.1 may be connected to or be a part of a network. For example, as shown in FIG. 4.2, the network (420) may include multiple nodes (e.g., node X (422), node Y (424)). Each node may correspond to a computing system, such as the computing system shown in FIG. 4.1, or a group of nodes combined may correspond to the computing system shown in FIG. 4.1. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (400) may be located at a remote location and connected to the other elements over a network.

Although not shown in FIG. 4.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4.1. Further, the client device (426) may include and/or perform at least a portion of one or more embodiments.

The computing system or group of computing systems described in FIGS. 4.1 and 4.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the claims. The processes may be part of the same or different application and may execute on the same or different computing system.

Rather than or in addition to sharing data between processes, the computing system performing one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments, may extract one or more data items from the obtained data. For example, the extraction may be performed as follows by the computing system in FIG. 4.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (including layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 4.1, while performing one or more embodiments, may perform data comparison. Data comparison may be used to compare two or more data values (e.g., A, B). For example, one or more embodiments may determine whether $A>B$, $A=B$, $A\,!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 4.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 4.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present a few examples of functions performed by the computing system of FIG. 4.1 and the nodes and/or client device in FIG. 4.2. Other functions may be performed using one or more embodiments.

While one or more embodiments have been described with respect to a limited number of embodiments, those skilled in the art, having benefit of this disclosure, will appreciate that other embodiments may be devised which do not depart from the scope as disclosed herein. Accordingly, the scope should be limited by the attached claims.

What is claimed is:

1. A method for raycasting based on an irregular grid, comprising:
   raycasting, in a static mode, a plurality of rays based on the irregular grid to generate a static image of a three dimensional (3D) volume dataset, wherein the 3D volume dataset comprises a plurality of irregular grid cells based on the irregular grid, wherein the static image is rendered in a rendering time based on raycasting the plurality of rays;
   determining a reduction factor for a tally of the plurality of rays by multiplying a target animation frame rate by the rendering time of the static image;
   reducing the tally of the plurality of rays according to the reduction factor to generate a reduced tally of rays; and
   generating, in a dynamic mode, an animation of the 3D volume dataset at the target animation frame rate by at least performing raycasting based on the reduced tally of rays.

2. The method of claim 1, further comprising:
   raycasting an initial segment of a ray of the plurality of rays based on the irregular grid;
   generating, based on a coarser granularity than the irregular grid, a plurality of coarse grid cells; and
   raycasting a remainder segment of the ray based at least on the plurality of coarse grid cells.

3. The method of claim 2, further comprising:
   generating, from the plurality of irregular grid cells, a plurality of initial traversed cells based on intersection by the initial segment of the ray; and
   accumulating, based on a plurality of data items of the 3D volume dataset that are associated with the plurality of traversed cells, a color and an opacity of raycasting the initial segment,
   wherein raycasting the remainder segment of the ray based at least on the plurality of coarse grid cells is in response to the opacity exceeding a pre-determined threshold.

4. The method of claim 2,
   wherein the plurality of coarse grid cells comprises at least one selected from a group consisting of a coarse irregular grid cell and a coarse regular grid cell.

5. The method of claim 1, further comprising:
   generating, based on a coarser granularity than the irregular grid, a plurality of coarse grid cells;
   identifying an active segment of a ray of the plurality of rays based on the active segment intersecting the 3D volume dataset; and
   raycasting a remainder segment of the ray based at least on the plurality of coarse grid cells.

6. The method of claim 1, further comprising:
   identifying, in at least one selected from the static mode and the dynamic mode, an initial segment of a ray of the plurality of rays, wherein the initial segment originates from a ray source and ends at a current irregular grid cell of the plurality of irregular grid cells;
   generating, based on a coarser granularity than the irregular grid, a plurality of coarse grid cells;
   selecting a coarse grid cell of the plurality of the coarse grid cells that connects with the current irregular grid cell and intersects a remainder segment of the ray; and
   raycasting, in response to the coarse grid cell not intersecting the 3D volume dataset, a remainder portion of the ray based at least on the coarse grid cell.

7. The method of claim 1, further comprising:
   identifying, in at least one selected from the static mode and the dynamic mode, an initial segment of a ray of the plurality of rays, wherein the initial segment originates from a ray source and ends at a current irregular grid cell of the plurality of irregular grid cells;
   generating, based on a coarser granularity than the irregular grid, a plurality of coarse grid cells;
   selecting a coarse grid cell of the plurality of the coarse grid cells that connects with the current irregular grid cell and intersects a remainder segment of the ray; and raycasting, in response to an opacity of raycasting the initial segment exceeding a pre-determined threshold, a remainder portion of the ray based at least on the coarse grid cell.

8. A computer system for raycasting based on an irregular grid, comprising:
a computer processor;
memory storing instructions executed by the computer processor, wherein the instructions comprise functionality for:
raycasting, in a static mode, a plurality of rays based on the irregular grid to generate a static image of a three dimensional (3D) volume dataset, wherein the 3D volume dataset comprises a plurality of irregular grid cells based on the irregular grid, wherein the static image is rendered in a rendering time based on raycasting the plurality of rays;
determining a reduction factor for a tally of the plurality of rays by multiplying a target animation frame rate by the rendering time of the static image;
reducing the tally of the plurality of rays, according to the reduction factor, to generate a reduced tally of rays; and
generating, in a dynamic mode, an animation of the 3D volume dataset at the target animation frame rate by at least performing raycasting based on the reduced tally of rays; and
a display device for rendering the static image and the animation.

9. The system of claim 8, wherein the instructions further comprise functionality for:
raycasting an initial segment of a ray of the plurality of rays based on the irregular grid;
generating, based on a coarser granularity than the irregular grid, a plurality of coarse grid cells; and
raycasting a remainder segment of the ray based at least on the plurality of coarse grid cells.

10. The system of claim 9, wherein the instructions further comprise functionality for:
generating. from the plurality of irregular grid cells, a plurality of initial traversed cells based on intersection by the initial segment of the ray; and
accumulating, based on a plurality of data items of the 3D volume dataset that are associated with the plurality of traversed cells, a color and an opacity of raycasting the initial segment,
wherein raycasting the remainder segment of the ray based at least on the plurality of coarse grid cells is in response to the color and the opacity exceeding a pre-determined threshold.

11. The system of claim 9,
wherein the plurality of coarse grid cells comprises at least one selected from a group consisting of a coarse irregular grid cell and a coarse regular grid cell.

12. The system of claim 8, wherein the instructions further comprise functionality for:
generating, based on a coarser granularity than the irregular grid, a plurality of coarse grid cells;
identifying an active segment of a ray of the plurality of rays based on the active segment intersecting the 3D volume dataset; and
raycasting a remainder segment of the ray based at least on the plurality of coarse grid cells.

13. The system of claim 8, wherein the instructions further comprise functionality for:
identifying, in at least one selected from the static mode and the dynamic mode, an initial segment of a ray of the plurality of rays, wherein the initial segment originates from a ray source and ends at a current irregular grid cell of the plurality of irregular grid cells;
generating, based on a coarser granularity than the irregular grid, a plurality of coarse grid cells;
selecting a coarse grid cell of the plurality of the coarse grid cells that connects with the current irregular grid cell and intersects a remainder segment of the ray; and
raycasting, in response to the coarse grid cell not intersecting the 3D volume dataset, a remainder portion of the ray based at least on the coarse grid cell.

14. The system of claim 8, wherein the instructions further comprise functionality for:
identifying, in at least one selected from the static mode and the dynamic mode, an initial segment of a ray of the plurality of rays, wherein the initial segment originates from a ray source and ends at a current irregular grid cell of the plurality of irregular grid cells;
generating, based on a coarser granularity than the irregular grid, a plurality of coarse grid cells;
selecting a coarse grid cell of the plurality of the coarse grid cells that connects with the current irregular grid cell and intersects a remainder segment of the ray; and
raycasting, in response to an opacity of raycasting the initial segment exceeding a pre-determined threshold, a remainder portion of the ray based at least on the coarse grid cell.

15. A non-transitory computer readable medium storing instructions to carry out the method according to any of claims 1-7.

* * * * *